(12) United States Patent
Brown et al.

(10) Patent No.: US 6,940,930 B2
(45) Date of Patent: *Sep. 6, 2005

(54) AUTOMATIC BURST MODE I/Q GAIN AND I/Q PHASE CALIBRATION USING PACKET BASED-FIXED CORRECTION COEFFICIENTS

(75) Inventors: James E. C. Brown, San Jose, CA (US); Bret Rothenberg, Los Altos, CA (US)

(73) Assignee: Texas Instruments Incorporated, Dallas, TX (US)

( * ) Notice: Subject to any disclaimer, the term of this patent is extended or adjusted under 35 U.S.C. 154(b) by 3 days.

This patent is subject to a terminal disclaimer.

(21) Appl. No.: 10/636,045

(22) Filed: Aug. 7, 2003

(65) Prior Publication Data

US 2004/0146121 A1 Jul. 29, 2004

Related U.S. Application Data

(63) Continuation-in-part of application No. 10/350,622, filed on Jan. 24, 2003.

(51) Int. Cl.[7] .............................................. H04L 27/06
(52) U.S. Cl. ...................... 375/343; 375/316; 375/147; 375/322; 375/326; 455/296; 455/313
(58) Field of Search ................................ 375/343, 316, 375/326, 322, 147, 235; 455/296, 313; 370/206

(56) References Cited

U.S. PATENT DOCUMENTS

| | | | |
|---|---|---|---|
| 6,330,290 B1 | 12/2001 | Glas | 375/324 |
| 6,377,620 B1 * | 4/2002 | Ozluturk et al. | 375/235 |
| 6,442,217 B1 * | 8/2002 | Cochran | 375/326 |
| 2003/0174641 A1 * | 9/2003 | Rahman | |
| 2004/0063416 A1 * | 4/2004 | Kuenen et al. | |
| 2004/0146120 A1 * | 7/2004 | Brown | |

OTHER PUBLICATIONS

Li Yu & W. Mation Snelgrove, "A Novel Adaptive Mismatch Cancellation System for Quadrature IF Radio Receiver", IEEE Transactions On Circuits and Systems—II: Analog and Digital Signal Processing, vol. 46, No. 6, pp. 789–801, Jun., 1999.

Ediz Cetin, Izzet Kale & Richard C. S. Morlin, "Adaptive Compensation of Analog Front–End I/Q Mismatches in Digital Receivers", pp. IV–370 to IV373, IEEE, 2001.

James K. Cavers, & Maria W. Liao, "Adaptive Compensation for Imbalance and Offset Losses in Direct Conversion Transceivers" IEEE Transactions on Vehicular Technology, vol. 42, No. 4, pp. 581–588, Nov., 1993.

Knog–pan Pun, Jose E. Franca & C. Azeredo–Leme, "Wideband Digital Correction and I and Q Mismatch in Quadrature Radio Receivers", ISCAS 2000—IEEE International Symposium on Circuits and Systems, May 28–31, 2000, pp. V661–V664, Geneva, Switzerland.

Ediz Cetin, Izzet Kale & Richard C. S. Morling, "On the Structure, Convergence and Performance of an Adaptive I/Q Mismatch Corrector", pp. 2288–2292, IEEE, 2002.

* cited by examiner

*Primary Examiner*—Shuwang Liu
*Assistant Examiner*—Eva Zheng
(74) *Attorney, Agent, or Firm*—Abdul Zindani; W. James Brady, III; Frederick J. Telecky, Jr.

(57) ABSTRACT

A method and apparatus for balancing I/Q gain and I/Q phase in a signal receiver. The receiver includes an IQ coefficient calculator and an IQ balancer. The IQ coefficient calculator computes a set of correction coefficients for each packet from the I and Q signals in an IQ measurement section at the front of the packet. The IQ balancer uses the correction coefficients for correcting the I/Q gain and I/Q phase errors on a packet-by-packet basis. Optionally, delay devices delay the I and Q signals so that the correction coefficients may be applied to the entire packet, or the portion of the packet in the IQ measurement section is passed through uncorrected and the correction coefficients are applied to the packet after the IQ measurement section.

10 Claims, 4 Drawing Sheets

US 6,940,930 B2

AUTOMATIC BURST MODE I/Q GAIN AND I/Q PHASE CALIBRATION USING PACKET BASED-FIXED CORRECTION COEFFICIENTS

This application is a continuation in part of Ser. No. 10,350,622, filed on Jan. 24, 2003.

BACKGROUND OF THE INVENTION

1. Field of the Invention

The invention relates generally to signal receivers having in-phase (I) and quadrature phase (Q) signal processing and more particularly to methods and apparatus for balancing I/Q gain and I/Q phase in a signal receiver.

2. Description of the Prior Art

Most modern radio signal receivers estimate the data that was transmitted by processing in-phase (I) and quadrature phase (Q) signal components. The I and Q signals should have a phase difference (I/Q phase) of 90° at the carrier frequency of the incoming signal and a gain ratio (I/Q gain) of unity. However imperfections in the analog circuitry used in the radio frequency (RF) quadrature downconverters in most modern signal receivers cause the I/Q gain and I/Q phase to be out of balance (I/Q gain not equal to one and I/Q phase not equal to 90°). These imbalances cause a degradation in bit error rate (BER) in estimating the transmitted data.

Existing signal receivers use several methods for correcting I/Q gain and I/Q phase imbalances within the receivers. In one method, an offline test signal is used during manufacture or installation to align the I/Q gain to unity and the I/Q phase to 90° in the signal receiver. However, the performance of the receivers using the test signal method is limited by drift in the analog circuitry after the alignment. This limitation is reduced by performing the alignment periodically during operation. However, the periodic alignment adds overhead that reduces the efficiency of a signal communication channel.

A second method uses an adaptive algorithm that processes the I and Q signals for converging to adjustments to the I and Q signals while the receiver is on-line. However, the BER performance of the receivers using the adaptive algorithm method is degraded because the receiver is estimating the transmitted data during the same on-line time period that the adaptive algorithm is converging. Of course, the adaptive algorithm could be performed on a test signal but this would add overhead and reduce signal efficiency.

Existing receivers using the test signal method or the adaptive algorithm method sometimes use correction coefficients for balancing I/Q gain and I/Q phase of the I and Q signals. However, such receivers that are known determine the I/Q gain and the I/Q phase corrections at points in the signal path that are separated from the RF quadrature downconverter by subsequent downconversion and/or demodulation of the I and Q signals. The performance of such receivers is limited because the imbalances are converted to image signals by the downconversion and/or demodulation and the degradation effect of such image signals cannot be completely eliminated once they are formed.

There is a need for a method for correcting I/Q gain and I/Q phase imbalance in a signal receiver without adding overhead to the signal communication channel and without degrading BER while converging on correction coefficients.

SUMMARY OF THE INVENTION

It is therefore an object of the present invention to provide a method and apparatus in a signal receiver for balancing I/Q gain and I/Q phase by computing packet-fixed correction coefficients for I and Q signals of an on-line operational incoming signal.

Briefly, in a preferred embodiment, the signal receiver of the present invention includes an IQ coefficient calculator and an IQ balancer. The IQ coefficient calculator computes correction coefficients for each incoming packet from the I and Q signals in an IQ measurement section at the front of the packet. Delay devices delay the I and Q signals so that the correction coefficients may be applied to the entire packet, or the portion of the packet in the IQ measurement section is passed through uncorrected and the correction coefficients are applied to the packet after the IQ measurement section.

Advantages of the present invention for balancing I/Q gain and I/Q phase are that no test signal is required, no communication overhead is added, and the correction coefficients are determined without degrading BER during the determination time period.

These and other objects and advantages of the present invention will no doubt become obvious to those of ordinary skill in the art after having read the following detailed description of the preferred embodiments which are illustrated in the various figures.

IN THE DRAWINGS

DETAILED DESCRIPTION OF THE PREFERRED EMBODIMENTS

Figure 1:
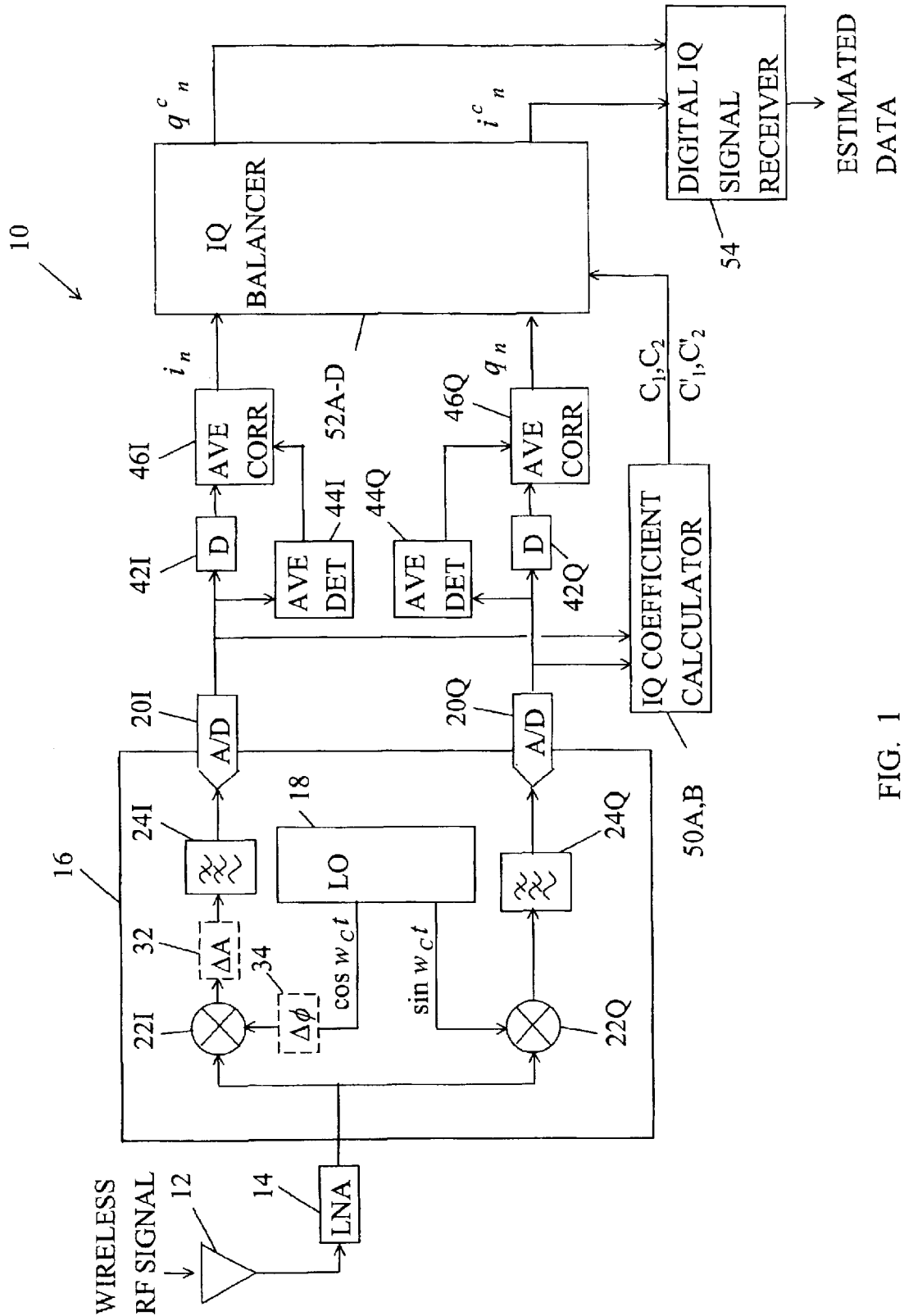
FIG. 1 is a block diagram of a signal receiver of the present invention.

FIG. 1 is a block diagram of a signal receiver 10 of the present invention. The receiver 10 includes an antenna 12, a low noise amplifier (LNA) 14, a quadrature downconverter 16 including a local oscillator system (LO) 18, and in-phase (I) and quadrature (Q) phase digital-to-analog converters (A/D)s 20I and 20Q. The antenna 12 converts a wireless radio frequency (RF) signal into a conducted form and passes the conducted RF signal to the LNA 14. The LNA 14 amplifies the conducted signal and passes an amplified RF signal to the quadrature downconverter 16. The quadrature downconverter 16 splits the amplified RF signal into in-phase (I) and quadrature phase (Q) signals that are processed in analog I and Q channels, respectively. The analog I channel includes an I mixer 22I, an I lowpass filter 24I, the analog portion of the A/D 20I, and associated hardware such as amplifiers, matching elements and additional filters. Similarly, the analog Q channel includes a Q mixer 22Q, a Q lowpass filter 24Q, the analog portion of the A/D 20Q, and associated hardware such as amplifiers, matching elements and additional filters.

The LO 18 generates an in-phase (I) LO signal, denoted as $\cos w_c t$, and a quadrature phase (Q) LO signal, denoted as $\sin w_c t$, and passes the I and Q LO signals to the I and Q mixers 22I and 22Q, respectively. The I and Q mixers 22I and 22Q use the I and Q LO signals to frequency down-convert the amplified RF signal from the LNA 14. The I and Q filters 24I and 24Q filter the I and Q downconverted signals to provide intermediate I and Q signals to the I and Q A/Ds 20I and 20Q, respectively. The carrier frequency of the intermediate I and Q signals may be baseband (zero frequency), near to but not exactly zero frequency, or some other frequency that is intermediate between the RF frequency and zero frequency depending upon other system considerations.

The quadrature downconverter 16 has an I/Q gain imbalance (error) 32 represented by ΔA and an I/Q phase imbalance (error) 34 represented by Δϕ. It should be noted that the I/Q gain error ΔA 32 and the I/Q phase error Δϕ 34 are not actual blocks in the block diagram of the quadrature downconverter 16, but are instead representations of imperfections in the quadrature downconverter 16. It is this I/Q gain error ΔA 32 and this I/Q phase error Δϕ 34 that the receiver 10 of the present invention corrects before the received signal is frequency converted again and/or demodulated in order to estimate the transmitted data.

The I/Q gain error ΔA 32 results in a gain ratio (I/Q gain) different than unity between an effective gain for the I signal and an effective gain for the Q signal. The effective gain for the I signal is the signal gain from the point at which the amplified signal from the LNA 14 is split into the I and Q signal components in the quadrature downconverter 16 until the point at which the intermediate I signal is converted to a digital form in the A/D 20I. The effective gain of the Q signal is the signal gain from the point at which the amplified RF signal from the LNA 14 is split into the I and Q signal components in the quadrature downconverter 16 until the intermediate Q signal is converted to a digital form in the A/D 20Q.

Similarly, it should be noted that the I/Q phase imbalance (error) Δϕ 34 results in a relative phase (I/Q phase) that is different than 90° between the effective phase of the I signal that is digitized by the A/D 20I and the effective phase of the Q signal that is digitized by the Q A/D 20Q. The relative phase (I/Q phase) includes the phase of the I signal LO cos $w_c t$ relative of the phase of the Q LO signal sin $w_c t$ and the effective signal phase shift from the point at which the amplified signal is split into I and Q signal components until the point at which the intermediate I signal is converted to a digital form in the A/D 20I relative to the effective signal phase shift from the point at which the amplified signal is split into I and Q signal components until the point at which the intermediate Q signal is converted to a digital form in the A/D 20Q.

The receiver 10 includes an IQ coefficient calculator 50A or 50B, an IQ balancer 52A or 52B, and a digital IQ signal receiver 54. The receiver 10 may also include optional I and Q latency time delay devices 42I and 42Q, optional I and Q average detectors 44I and 44Q, and optional I and Q average correctors 46I and 46Q, The I and Q delay devices 42I and 42Q, the I and Q average detector 44I and 44Q, and the IQ coefficient calculator 50A,B receive the digital I and Q signals from the I and Q A/Ds 20I and 20Q, respectively. After a certain number N of digital sample indexes n, equivalent to a latency time delay D where D equals N times the digital sample time for the indexes n, the I and Q delay devices 42I and 42Q reissue the digital I and Q signals to the I and Q average correctors 46I and 46Q.

Typically, the digital I and Q signals are received as packets (FIG. 3) and the index N is equal to some portion of the total number of indexes n that are used for sampling one packet. The index N may be varied from close to 100% to 5% or even less of the total number of indexes n depending upon system considerations. Increasing the index N increases latency and decreases noise in the corrections. Decreasing the index N decreases latency and increases noise in the corrections. Preferably, the index N is about 10% to 30% of the total number of indexes n. For example, for a packet having a total number 942 of sample indexes n, the index N may be 192.

The I and Q average detectors 44I and 44Q use the number N of indexes n to calculate the averages for the digital I and Q signals, respectively, and pass I and Q average corrections to the I and Q average correctors 46I and 46Q. The I and Q average correctors 46I and 46Q use the I and Q average corrections based upon the first N of the indexes n for removing DC offset from digital I and Q signals for the entire packet from beginning to end. The IQ balancer 52A,B receives the zero average digital I and Q signals, denoted $i_n$ and $q_n$, respectively, from the I and Q average correctors 46I and 46Q. In an alternative embodiment, the optionally delayed I and Q signals are passed directly to the IQ balancer 52A,B and the averaging is performed further downstream in the digital IQ signal receiver 54.

Figure 3:
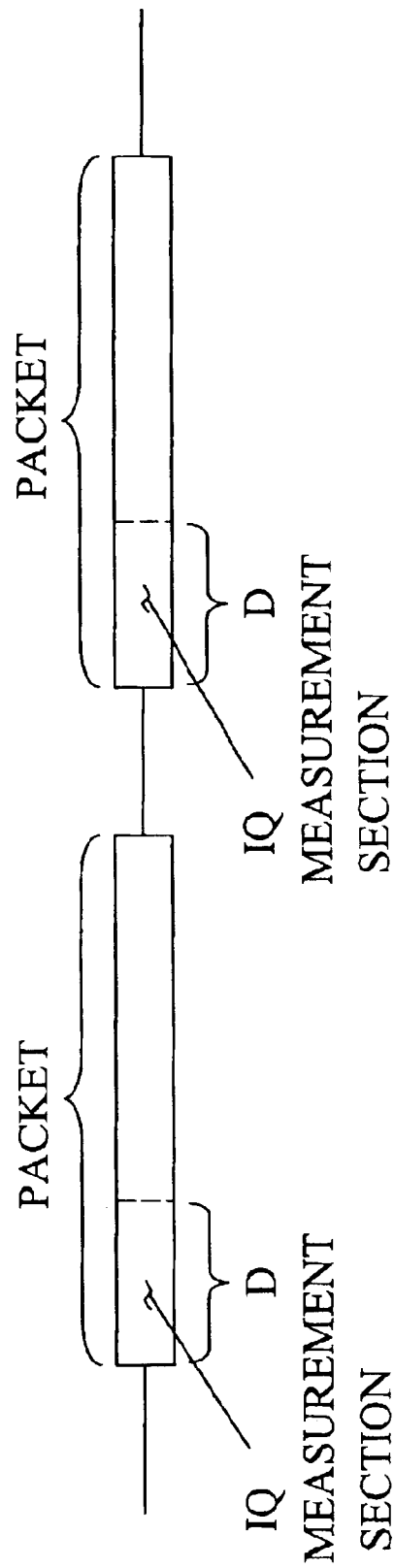
FIG. 3 is a time chart of a packet received by the receiver of FIG. 1.

The first N of the indexes n of the digital I and Q signals from the A/Ds 20I and 20Q are selected or defined as an IQ measurement section D of the packet (FIG. 3). The IQ coefficient calculator 50A,B uses the first N of the n indexes to calculate first and second correction coefficients. When the optional I and Q delay devices 42I and 42Q are not used, the digital I and Q signals from the I and Q A/Ds 20I and 20Q are passed directly to the I and Q average detectors 46I and 46Q or the IQ balancer 52A,B. In this case the latency time of the IQ measurement section D may be avoided, however, the symbols in the IQ measurement section D of the packet (FIG. 3) are not corrected in the IQ balancer 52A,B.

The first and second correction coefficients correspond roughly to phase and gain correction coefficients. In a first embodiment, the IQ coefficient calculator 50A calculates a first correction coefficient $C_1$ and a second correction coefficient $C_2$ as described in equations 1 and 2, below. In a second embodiment, the IQ coefficient calculator 50B calculates a first correction coefficient $C'_1$ and a second correction coefficient $C'_2$ as described in equations 3 and 4, below.

$$C_1 = \frac{\sum_{n=1}^{N} |q_n|}{\sum_{n=1}^{N} \left| i_n - q_n \left( \sum_{n=1}^{N} i_n q_n \bigg/ \sum_{n=1}^{N} q_n q_n \right) \right|} \quad (1)$$

$$C_2 = -\sum_{n=1}^{N} i_n q_n \bigg/ \sum_{n=1}^{N} q_n q_n \quad (2)$$

$$C'_1 = \frac{\sum_{n=1}^{N} |q_n|}{\sum_{n=1}^{N} \left| i_n - q_n \left( \sum_{n=1}^{N} i_n q_n \bigg/ \sum_{n=1}^{N} q_n q_n \right) \right|} \quad (3)$$

-continued $$C'_2 = \frac{-\sum_{n=1}^{N}|q_n|\left(\sum_{n=1}^{N}i_nq_n \Big/ \sum_{n=1}^{N}q_nq_n\right)}{\sum_{n=1}^{N}\left|i_n - q_n\left(\sum_{n=1}^{N}i_nq_n \Big/ \sum_{n=1}^{N}q_nq_n\right)\right|} \quad (4)$$

The IQ balancer 52A,B uses the first and second correction coefficients $C_1$ and $C_2$ (or $C'_1$ and $C'_2$) to balance and correct the digital I and Q signals $i_n$ and $q_n$ in order to provide corrected digital I and Q signals, denoted as $i^c_n$ and $q^c_n$. It should be noted that the correction coefficients in the present invention are fixed for each packet. Where the optional I and Q delay devices 42I and 42Q are included, the correction coefficients are applied to the entire packet of delayed I and Q signals. Where the I and Q delay devices 42I and 42Q are not included, the IQ measurement section D (FIG. 3) is the packet is not corrected. In this case the correction coefficients are applied to the portion of the packet that follows the IQ measurement section D. The corrected digital I and Q signals $i^c_n$ and $q^c_n$ are passed to the digital IQ signal receiver 54. The digital IQ signal receiver 54 includes synchronization, demodulation, equalization, and bit detection subsystems for estimated the data that was carried by the wireless RF signal.

Figure 2B:
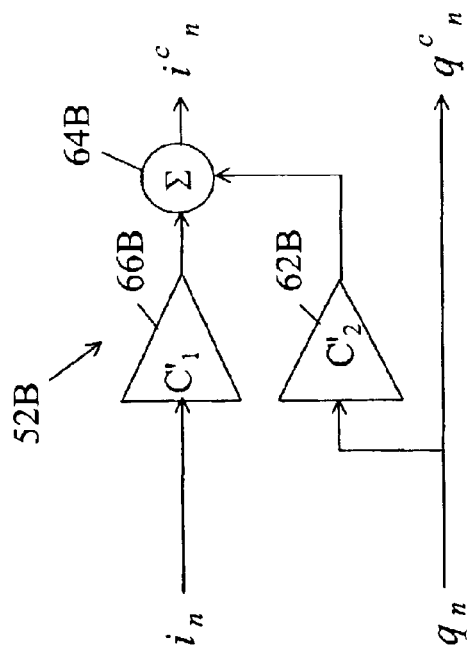
FIGS. 2A and 2B are first and second embodiments, respectively, of IQ balancers of the receiver of FIG. 1.
Figure 2A:
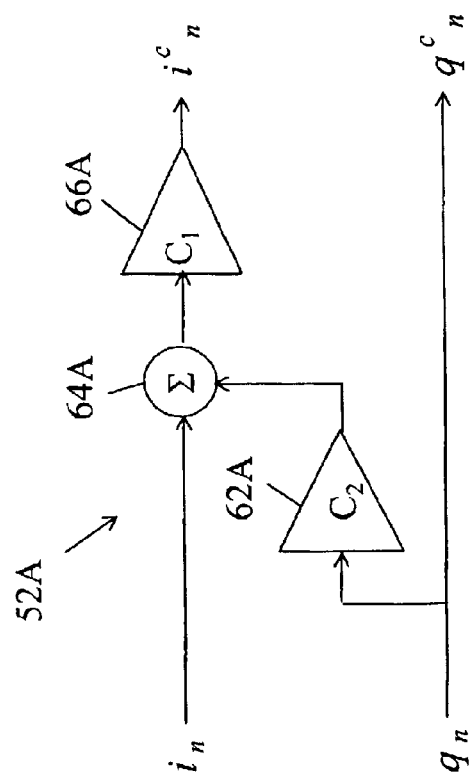

FIGS. 2A and 2B are functional block diagrams of first and second embodiments of the IQ balancers 52A and 52B, respectively. The first embodiment IQ balancer 52A includes a phase balancer 62A, a summer 64A, and a gain balancer 66A. The phase balancer 62A multiplies the Q signal $q_n$ by the second coefficient $C_2$ to provide a phase correction signal $C_2*q_n$ to the summer 64A. The summer 64A adds the phase correction signal $C_2*q_n$ to the I signal $i_n$ and passes the sum $C_2*q_n+i_n$ to the gain balancer 66A. The gain balancer 66A multiplies the sum $C_2*q_n+i_n$ by the first coefficient $C_1$ to provide the corrected I signal $i^c_n=C_1*(C_2*q_n+i_n)$. The Q signal $q_n$ is passed straight through as the corrected Q signal $q^c_n$. Of course, the processing of the I and Q signals $i_n$ and $q_n$ could be exchanged.

Similarly, the second embodiment IQ balancer 52B includes a phase balancer 62B, a summer 64B, and a gain balancer 66B. The phase balancer 62B multiplies the Q signal $q_n$ by the second coefficient $C'_2$ and provides a phase correction signal $C'_2*q_n$ to the summer 64B. The gain balancer 66B multiplies the I signal $i_n$ by the first coefficient $C'_1$ and provides an amplitude correction signal $C'_1*i_n$ to the summer 64B. The summer 64B adds the phase correction signal $C'_2*q_n$ to the amplitude correction digital $C'_1*i_n$ and provides the corrected I signal $i^c_n=C'_1*i_n$ as the sum. The Q signal $q_n$ is passed straight through as the corrected Q signal $q^c_n$. Of course, the processing of the I and Q signals $i_n$ and $q_n$ could be exchanged.

Simple algorithms for computing the correction coefficients in the IQ coefficient calculator 50A,B are described with the aid of equations 5–12.

$$K_1 = \sum_{n=1}^{N} i_n q_n \quad (5)$$

$$K_2 = \sum_{n=1}^{N} q_n q_n \quad (6)$$

-continued $$K_3 = \frac{K_1}{K_2} \quad (7)$$

$$K_4 = \sum_{n=1}^{N} |q_n| \quad (8)$$

$$K_5 = \sum_{n=1}^{N} |i_n - K_3 q_n| \quad (9)$$

$$C_1 = C'_1 = \frac{K_4}{K_5} \quad (10)$$

$$C_2 = -K_3 \quad (11)$$

$$C'_2 = -C'_1 K_3 \quad (12)$$

The IQ coefficient calculator 50A,B computes the correction coefficients using the following algorithm: Given a vector of finite length N with indexes n for indexed I elements $i_n$ and an equal length vector of indexed Q elements $q_n$, let a first term $K_1$ equal the dot product (cross correlation) of the $i_n$ elements and the $q_n$ elements, let a second term $K_2$ equal a dot product (autocorrelation) of the $q_n$ elements and the $q_n$ elements, let a third term $K_3$ equal the quotient of the first term $K_1$ divided by the second term $K_2$, let a fourth term $K_4$ equal the sum of the absolute values of the $q_n$ elements, let Z be a vector of elements representing the $i_n$ elements minus the product of the $q_n$ elements times the third term $K_3$, and finally let a fifth term $K_5$ equal a sum of the absolute values of the Z elements.

For the first embodiment where the IQ balancer 52A corrects I and Q signals according to $i^c_n=C_1*(C_2*q_n+i_n)$ and $q^c_n=q_n$, the IQ coefficient calculator 50A computes the first correction coefficient $C_1$ equal to the fourth term $K_4$ divided by the fifth term $K_5$ and computes the second correction coefficient $C_2$ equal to the negative of the third term $K_3$.

For the second embodiment where the IQ balancer 52B corrects the I and Q signals according to $i^c_n=C'_1*i_n+C'_2*q_n$ and $q^c_n=q_n$, the coefficient calculator 50B computes the first correction coefficient $C'_1$ equal to the fourth term $K_4$ divided by the fifth term $K_5$ and computes the second correction coefficient $C'_2$ equal to the negative of the product of the first coefficient $C'_1$ times the third term $K_3$.

It should be understood that it is equivalent to exchange the processing of the $i_n$ and $q_n$ vectors for the equivalent result in the first embodiment and in the second embodiment.

Figure 2D:
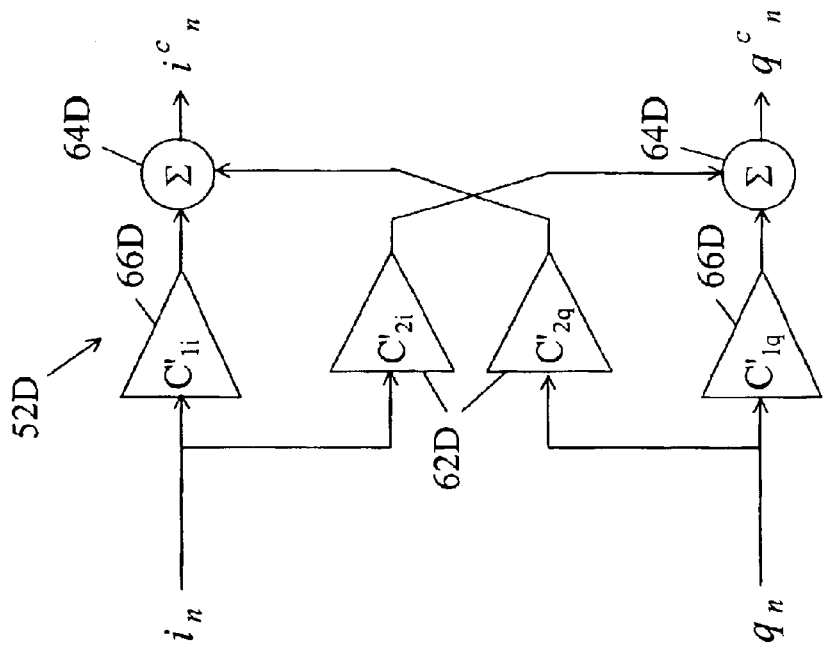
FIGS. 2C and 2D are variations of the IQ balancers of FIGS. 2A and 2B, respectively.
Figure 2C:
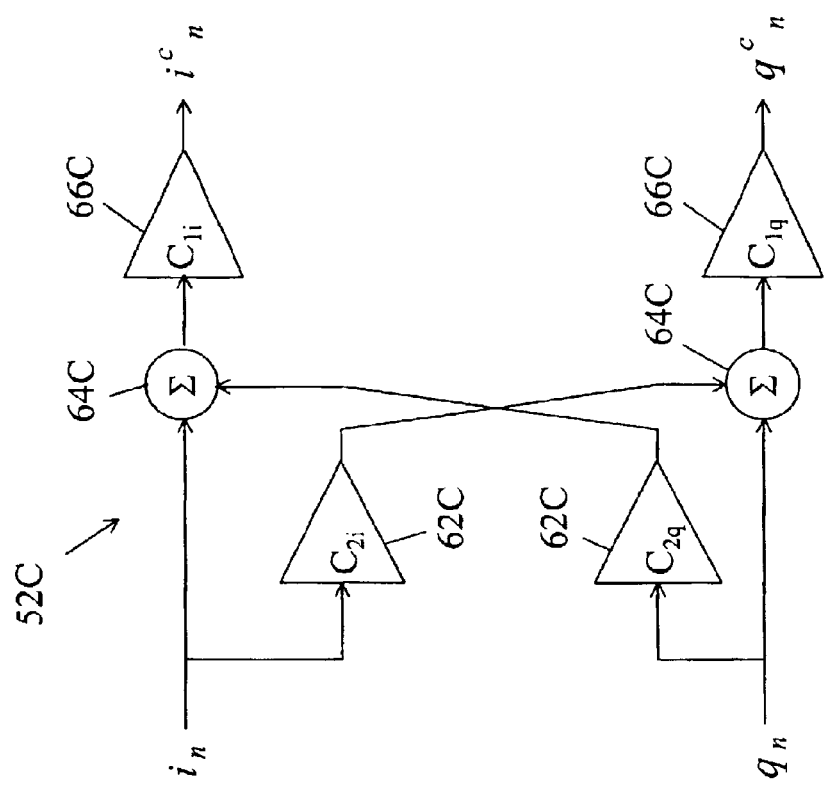

FIGS. 2C and 2D are block diagrams of symmetrical variations of the IQ balancers 52A and 52B referred to with reference identifiers 52C and 52D, respectively. The IQ balancer 52C includes a phase balancer 62C, a summer 64C, and a gain balancer 66C. The phase balancer 62C multiplies the Q signal $q_n$ by a coefficient $C_{2q}$ for providing a phase correction signal $C_{2q}*q_n$ and multiplies the I signal $i_n$ by a coefficient $C_{2i}$ for providing a phase correction signal $C_{2i}*i_n$. The summer 64C sums the phase correction signal $C_{2q}*q_n$ with the I signal $i_n$ and sums the phase correction signal $C_{2i}*i_n$ with the Q signal $q_n$ and then passes the sums to the gain balancer 66C. The gain balancer 66C multiplies the sum $C_{2q}*q_n+i_n$ by a coefficient $C_{1i}$ to provide the corrected I signal $i^c_n=C_{1i}*(C_{2q}*q_n+i_n)$ and multiplies the sum $C_{2i}*i_n+q_n$ by a coefficient $C_{1q}$ to provide the corrected Q signal $q^c_n=C_{1q}*(C_{2i}*i_n+q_n)$. It should be apparent that the values of any two of the coefficients $C_{1i}$, $C_{1q}$, $C_{2i}$ and $C_{2q}$ depend upon the values of the first coefficient $C_1$, the second coefficient $C_2$, and whatever values are selected for the other two of the coefficients $C'_{1i}$, $C'_{1q}$, $C'_{2i}$ and $C'_{2q}$. For example, if $C_{1q}$ is selected as unity (one) and $C_{2i}$ is selected as zero, then $C_{1i}$ equals the first coefficient $C_1$ and $C_{2q}$ equals the second coefficient $C_2$. It should be noted that in this case the block diagram of FIG. 2C reduces to the block diagram of FIG. 2A.

The IQ balancer 52D includes a phase balancer 62D, a summer 64D, and a gain balancer 66D. The phase balancer 62D multiplies the Q signal $q_n$ by a coefficient $C'_{2q}$ for a phase correction signal $C'_{2q}*q_n$ and multiplies the I signal $i_n$ by a coefficient $C'_{2i}$ for a phase correction signal $C'_{2i}*i_n$. The gain balancer 66D multiplies the Q signal $q_n$ by a coefficient $C'_{1q}$ and multiplies the I signal $i_n$ by a coefficient $C'_{1i}$. The summer 64D adds the phase correction signal $C'_{2q}*q_n$ to the I gain signal $C'_{1i}*i_n$ to provide the corrected I signal $C'_{2q}*q_n + C'_{1i}*i_n$ and adds the phase correction signal $C'_{2i}*i_n$ to the Q gain signal $C'_{1q}*q_n$ to provide the corrected I signal $C'_{2i}*i_n + C'_{1q}*q_n$. It should be apparent that the values of any two of the coefficients $C'_{1i}$, $C'_{1q}$, $C'_{2i}$ and $C'_{2q}$ depend upon the values of the first coefficient $C'_1$, the second coefficient $C'_2$, and whatever values are selected for the other two of the coefficients $C'_{1i}$, $C'_{1q}$, $C'_{2i}$ and $C'_{2q}$. For example, if $C'_{1q}$ is selected as unity (one) and $C'_{2i}$ is selected as zero, then $C'_{1i}$ is the first coefficient $C'_1$ and $C'_{2q}$ is the second coefficient $C'_2$. It should be noted that in this case the block diagram of FIG. 2C reduces to the block diagram of FIG. 2A.

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A method for automatic I/Q balancing for packets of an incoming signal, comprising:

resolving an on-line incoming signal into I and Q signals;

computing packet-fixed correction coefficients from said I and Q signals during a measurement section for a packet;

correcting at least one of I/Q gain and I/Q phase of said I and Q signals with said packet-fixed correction coefficients for providing corrected said I and Q signals for said packet;

delaying said I and Q signals by at least said measurement section; and wherein the step of correcting includes correcting said at least one of said I/Q gain and said I/Q phase of said delayed I and Q signals with said packet-fixed correction coefficients for providing said corrected I and Q signals;

detecting pre-delay averages for said I and Q signals for a time period not greater than said measurement section before the step of delaying said I and Q signals; and using said pre-delay averages for reducing DC offset from said delayed I and Q signals before the step of correcting said I and Q signals.

2. A method for automatic I/Q balancing for packets of an incoming signal, comprising:

resolving an on-line incoming signal into I and Q signals;

computing packet-fixed correction coefficients from said I and Q signals during a measurement section for a packet;

correcting at least one of I/Q gain and I/Q phase of said I and Q signals with said packet-fixed correction coefficients for providing corrected said I and Q signals for said packet, wherein the step of correcting includes using said packet-fixed correction coefficients for correcting said at least one of said I/Q gain and said I/Q phase for a portion of said packet only after said measurement section of said packet for providing said corrected I and Q signals;

detecting averages for said I and Q signals for a time period not greater than said measurement section; and using said averages for reducing DC offset of said I and Q signals for a time period of said packet after said measurement section before the step of correcting said I and Q signals.

3. A method for automatic I/Q balancing for packets of an incoming signal, comprising:

resolving said incoming signal into I and Q signals;

computing packet-fixed correction coefficients from said I and Q signals during a measurement section for a packet;

correcting at least one of I/Q gain and I/Q phase of said I and Q signals with said packet-fixed correction coefficients for providing corrected said I and Q signals for said packet; and wherein:

the step of computing packet-fixed correction coefficients includes computing first and second correction coefficients using a finite number of indexed I values for said I signal and said finite number of indexed Q values for said Q signal; where a first term includes a cross correlation of said I values and said Q values;

a second term includes an autocorrelation of said Q values;

a third term includes said first term divided by said second term;

a fourth term includes a sum of absolute values of said Q values;

a fifth term includes a sum of absolute values of difference values, said difference values including said I values minus product values, said product values including said Q values times said third term; and said first correction coefficient includes said fourth term divided by said fifth term.

4. The method of claim 3, wherein:

said second correction coefficient includes the negative of said third term.

5. The method of claim 3, wherein:

said second correction coefficient includes a negative of a product of said first correction coefficient and said third term.

6. A signal receiver having automatic I/Q balancing for packets of an incoming signal, comprising:

a quadrature converter for resolving an on-line incoming signal into I and Q signals;

an IQ coefficient calculator for computing packet-fixed correction coefficients from said I and Q signals during a measurement section of a packet;

an IQ balancer for using said packet-fixed correction coefficients for correcting at least one of I/Q gain and I/Q phase of said I and Q signals for providing corrected said I and Q signals for said packet;

I and Q delay devices for delaying said I and Q signals by at least said measurement section; wherein the IQ balancer corrects said at least one of said I/Q gain and said I/Q phase of said delayed I and Q signals with said packet-fixed correction coefficients for providing said corrected I and Q signals;

an average detector for detecting pre-delay averages for said I and Q signals for a time period not greater than said measurement section before the step of delaying said I and Q signals; and an average corrector for using said pre-delay averages for reducing DC offset from said delayed I and Q signals before the step of correcting said I and Q signals.

7. A signal receiver having automatic I/Q balancing for packets of an incoming signal, comprising:

a quadrature converter for resolving an on-line incoming signal into I and Q signals:

an IQ coefficient calculator for computing packet-fixed correction coefficients from said I and Q signals during a measurement section of a packet;

an IQ balancer for using said packet-fixed correction coefficients for correcting at least one of I/Q gain and I/Q phase of said I and Q signals for providing corrected said I and Q signals for said packet, wherein the IQ balancer uses said packet-fixed correction coefficients for correcting said at least one of said I/Q gain and said I/Q phase of said I and Q signals for a time period of said packet only after said measurement section for providing said corrected I and Q signals;

an average detector for detecting averages for said I and Q signals for a time period not greater than said measurement section; and an average corrector for using said averages for reducing DC offset of said I and Q signals for a time period of said packet after said measurement section before the step of correcting said I and Q signals.

8. A signal receiver having automatic I/Q balancing for packets of an incoming signal, comprising:

a quadrature converter for resolving said incoming signal into I and Q signals;

an IQ coefficient calculator for computing packet-fixed correction coefficients from said I and Q signals during a measurement section of a packet;

an IQ balancer for using said packet-fixed correction coefficients for correcting at least one of I/Q gain and I/Q phase of said I and Q signals for providing corrected said I and Q signals for said packet; and wherein:

the IQ coefficient calculator computes first and second said correction coefficients using a finite number of indexed I values for said I signal and said finite number of indexed Q values for said Q signal; where a first term includes a cross correlation of said I values and said Q values;

a second term includes an autocorrelation of said Q values;

a third term includes said first term divided by said second term;

a fourth term includes a sum of absolute values of said Q values;

a fifth term includes a sum of absolute values of difference values, said difference values including said I values minus product values, said product values including said Q values times said third term; and said first correction coefficient includes said fourth term divided by said fifth term.

9. The receiver of claim 8, wherein:

said second correction coefficient includes the negative of said third term.

10. The receiver of claim 8, wherein:

said second correction coefficient includes a negative of a product of said first correction coefficient and said third term.

* * * * *